United States Patent [19]
Heidari

[11] Patent Number: 5,854,978
[45] Date of Patent: Dec. 29, 1998

[54] REMOTELY PROGRAMMABLE MOBILE TERMINAL

[75] Inventor: Alireza Ryan Heidari, Encinitias, Calif.

[73] Assignee: Nokia Mobile Phones, Ltd., Salo, Finland

[21] Appl. No.: 632,910

[22] Filed: Apr. 16, 1996

[51] Int. Cl.$^6$ ................................. H04Q 7/14; H04Q 7/18
[52] U.S. Cl. ........................... 455/418; 455/403; 455/419; 455/420
[58] Field of Search .................................... 455/403, 418, 455/419, 412, 414, 420, 550, 560, 553, 249.1, 561; 370/466, 396; 395/200.76

[56] References Cited

U.S. PATENT DOCUMENTS

| | | | |
|---|---|---|---|
| 4,947,454 | 8/1990 | Garner | 455/249.1 |
| 5,295,178 | 3/1994 | Nickel et al. | 455/561 |
| 5,414,751 | 5/1995 | Yamada | 455/418 |
| 5,566,173 | 10/1996 | Steinbrecher | 455/418 |

*Primary Examiner*—Wellington Chin
*Assistant Examiner*—Keith Ferguson
*Attorney, Agent, or Firm*—Perman & Green, LLP

[57] ABSTRACT

A telephone system including mobile telephonic stations provides for a remote programming of the telephones of respective ones of the mobile stations upon an indication from each of the respective telephones of a type of digital signal processor (DSP) employed by the telephone. Various programs are stored at a base station for implementing various protocols in the compression and in the expansion of voice signals processed by the DSP. Such programs include differences in the output compressed signal bandwidth to be allocated to a specific service area of a base station at a specific time of day, by way of example. Programs operating the DSP can be changed upon request of a subscriber and/or upon direction from the base station. Program changes may occur also upon a hand-off between service areas of different base stations. Plural memories may be provided in an individual telephone to permit operation with one protocol during reception of a program for a different protocol. In the event of surplus channel capacity for communication via the base station, the subscriber may request, possibly at an extra monetary charge, a higher transmission bandwidth of compressed voice signal for improved voice quality.

13 Claims, 4 Drawing Sheets

REMOTELY PROGRAMMABLE MOBILE TERMINAL

BACKGROUND OF THE INVENTION

This invention relates to the digital signal processing of telephonic signals in a mobile or cellular telephone in accordance with a specific program or protocol controlling the processes of compression and expansion of voice/data for communication between a mobile station and a base station and, more particularly, to a transmission of a selected one of a plurality of programs or protocols from the base station to the mobile station.

Mobile telephones may be operated in an analog or a digital mode of operation. The digital mode of operation enables the telephone system to accommodate an increased number of concurrent communications among numerous mobile telephones by virtue of a compression of an outgoing voice signal from a mobile telephone to the base station, and an expansion of an incoming voice signal to the mobile station from the base station. The electric circuitry in the mobile telephone which provides these functions is frequently referred to as a digital signal processor (DSP). In order to maintain such a system of compression and expansion, it is necessary for all mobile telephones communicating with a common base station to employ a common protocol of the compression and the expansion. Such communication is readily accomplished in a modern cellular telephone system by use of code division multiple access (CDMA) in accordance with international standards such as IS95 and IS96 which establish the protocol for the compression and expansion.

Improvements in the protocol and the corresponding programming of the DSP are made frequently. Such improvements include sampling techniques and processing of signal samples for improved voice quality in a given transmission bandwidth, by way of example. Also, there may be selective bandwidth transmission by which a telephone subscriber may select a larger transmission bandwidth, as may be useful for transmission of music or other data. In addition, it is noted that changes may occur in future embodiments of the circuitry of a DSP to facilitate implementation of the compression and the expansion functions. Also, the construction of DSP circuitry may vary in the products produced by various manufacturers.

The foregoing situation introduces a problem in that there is a need to adapt the operational characteristics of a mobile telephone to accommodate different protocols which may be in existence at the present, or which may be developed in the future. However, in the present mobile telephones, and in the present cellular telephone systems, such adaptivity is not available, and the cellular telephones must be operated in accordance with a specific protocol.

SUMMARY OF THE INVENTION

The aforementioned problem is overcome and other advantages are obtained, in accordance with the invention, by providing a cellular telephone system and the mobile telephones contained therein with the capacity to operate with different protocols and programming may be desired. Thereby, a mobile telephone is adaptable to operate with any of numerous protocols and programs. This greatly facilitates the manufacture of mobile telephones because the manufacturer is not restricted to a specific form of DSP circuitry. Furthermore, the adaptive feature of the invention allows the telephone subscribers of an individual base station to experiment with different protocols whereby a survey of subscribers may be conducted to determine the most desirable protocol.

The invention is based upon the fact that present DSP circuitry includes a programmable computer operating in conjunction with memories for storing records of voice/data signals, plus comparison and correlation circuitry enabling recognition of speech patterns. By way of example, in the compression process, the speech patterns include repetitive components which may be dropped to obtain compression, and reinserted to obtain the expansion. Digital filtering may be accomplished in the time domain by use of delay elements in conjunction with multipliers and summations. In particular, it is noted that the necessary hardware, in terms of electrical circuitry, is present for accomplishing numerous procedures of compression/expansion, each procedure being implemented by suitable programming of the computer.

The invention is implemented by storing at the base station the various programs of candidate protocols, including variations of the individual programs to accommodate differences in the various computers and ancillary circuit present in the DSP's produced by various manufacturers. A telephone which has not yet been programmed, and which is to be put into service by a telephone subscriber, transmits via the control channel to the base station a digital word requesting a program. The digital word also includes an identification of the type of DSP in the telephone so that the base station can select a program tailored to the specific DSP. In response to the request, the base station transmits to the mobile telephone a program which directs the DSP to perform compression and expansion of voice/data signals in accordance with the protocol employed by the numerous mobile telephones which communicate via the common base station. The program is stored at the individual mobile telephones. In the event that the programming is to be altered, the base station commands the telephones in its service area to receive a new program, and then proceeds to transmit the new programs which replaces the program previously stored at the respective mobile telephones.

By way of example in the use of such down-loaded programs by the mobile telephones, there may be severe restrictions on bandwidth during intervals of heavy traffic, so as to accommodate peak demand for telephone service as may occur during the daytime. However, late at night, there is lower traffic and the subscribers may be allocated a larger bandwidth with the resulting improvement in fidelity and/or speed of communication. The mode of compression is based on the available bandwidth and, accordingly, would be altered upon command of the base station to accommodate the narrow daytime bandwidth and the wide nighttime bandwidth. This change in protocol may be accomplished by transmission of a new program to the mobile telephones at the beginning of each of the high and the low traffic times. Alternatively, if desired, the mobile telephones can store both programs, with a switch-over between the programs occurring upon command of the base station. Another example of the case of such a switch over is the traveling of the mobile telephone from the high traffic service area of an urban base station to the low traffic service area of a suburban base station.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element in the different figures but may not be referenced in the description for all figures.

DETAILED DESCRIPTION

Figure 1:
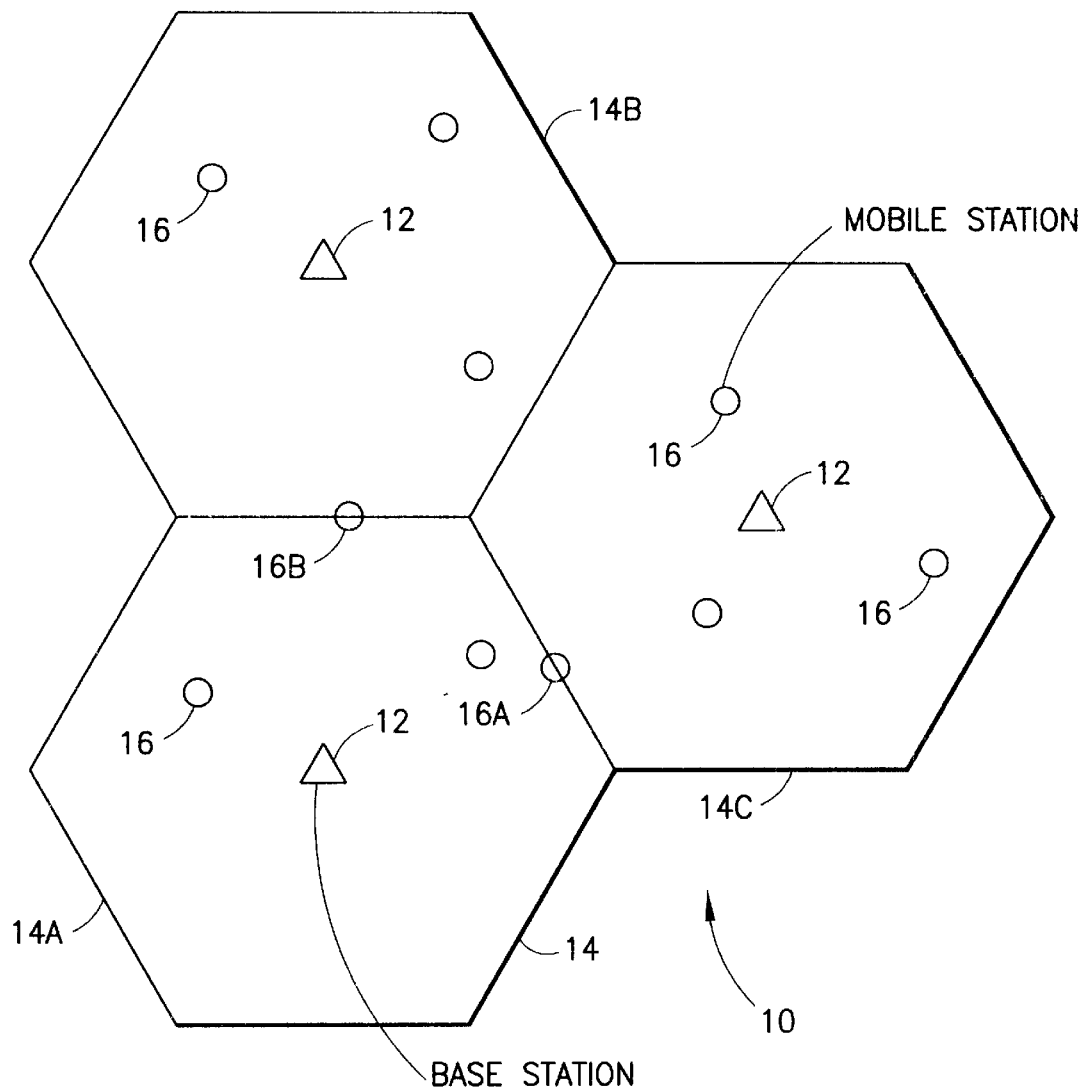
FIG. 1 shows diagrammatically a cellular telephone with plural service areas under control of respective base stations, each service area having a plurality of mobile stations.

FIG. 1 shows a cellular telephone system 10 having a plurality of base stations 12 serving respective service ares represented by cells 14. Mobile telephone stations 16 are located within each of the cells 14 and, within any one of the cells 14, communicate via the respective base station 12. Communication between mobile stations 16 located in different cells 14 includes a signal transmission between the base stations 12 of the respective cells 14. Such communication may be accomplished by communication links located on the earth or via a satellite encircling the earth. Generally, a mobile station 16 is a vehicle carrying a cellular telephone. However, the invention is applicable also to a situation wherein a cellular type of telephone is disposed in a station at a fixed location, such as in a remote location wherein it is impractical to have telephone lines.

The telephones at respective ones of the mobile stations 16 are understood to have the capability to communicate digitally with voice compression during transmission of outgoing signals, and with voice expansion during reception of incoming signals. While the invention is to be described with reference to voice signals, it is to be understood that other forms of signals, such as data and music signals may be communicated via the system 10. Modern cellular telephones include a DSP (to be described hereinafter) which includes electrical circuitry for performing the functions of compression of the voice signal and the expansion of the voice signal, both of these functions being performed with the aid of a computer within the DSP which operates the compression and the expansion circuitry in accordance with a specific compression/expansion protocol. The protocol may designate specific modes of sampling of the voice signal, and may also designate an output bandwidth of the compressed signal. By way of example, a relatively low bandwidth is available in situations of high telephone traffic so as to accommodate the system 10 to the task of communicating the numerous telephone conversations within a constraint of overall bandwidth. In contrast, in situations where the telephone traffic is relatively low, a higher bandwidth can be allocated for the compressed voice signals while still maintaining the overall bandwidth constraint for the system 10.

The amount of telephone traffic, whether high or low telephone traffic, is dependent on the time of the day within any one of the cells 14, and also on the nature of the region, such as a rural region or an urban region within a cell 14. The invention provides the capability of altering the protocol within the telephones of any one of the cells 14 so as to accommodate the constraints on compressed-signal bandwidth presented by the amount of telephone traffic. By way of example, two of the cells 14A and 14B represent rural areas with relatively low traffic while a third cell 14C is in an urban area having a relatively high traffic. One of the mobile stations 16A is traveling between the rural cell 14A to the urban cell 14C. The base stations 12 of the two cells 14A and 14C may be operating with the same protocol, or may be operating with different protocols to take advantage of the wider permissible signal bandwidth of the cell 14A and the narrower permissible bandwidth of the cell 14C. The wider bandwidth is advantageous for providing a higher fidelity to the transmitted voice signals while the narrower bandwidth of the cell 14C is advantageous for permitting a larger number of concurrent telephonic communications. Accordingly, in the hand-off of the station 16A between the base stations 12 of the cells 14A and 14C, the system 10, in accordance with the invention, must have the capacity to change the protocol in the event that such change is necessary. In contrast, the traveling of the mobile station 16B from the cell 14A to the cell 14B involves a hand-off wherein no change of operating protocol is required because both of these cells 14A and 14B are rural low-traffic areas.

Figure 2:
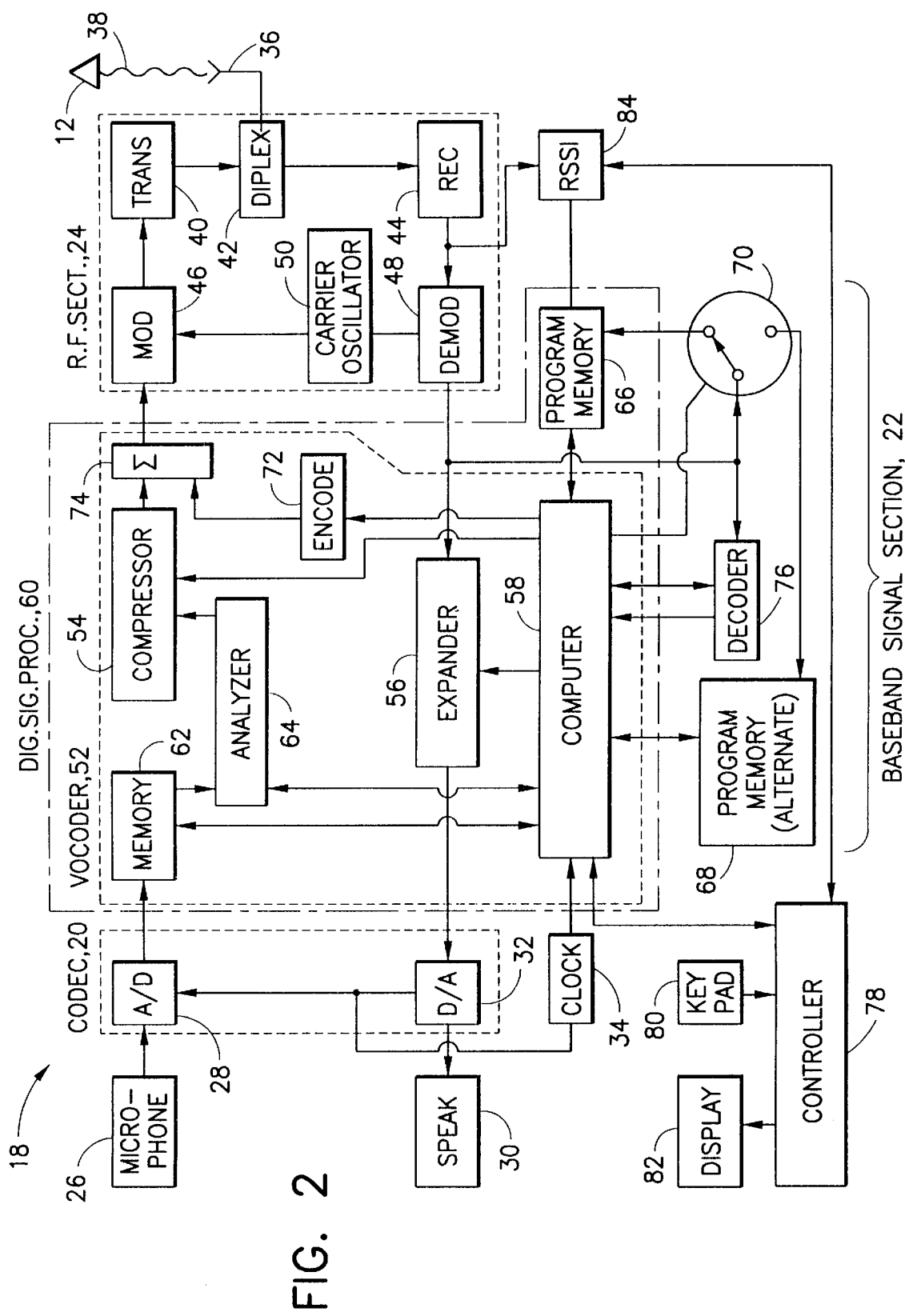
FIG. 2 is a block diagram of telephone circuitry at a mobile station, the circuitry being programmable in accordance with the invention.

FIG. 2 shows details in the construction of a cellular telephone 18 employed in each of the mobile stations 16 of FIG. 1. In FIG. 2, the cellular telephone 18 comprises a codec 20, a baseband signaling section 22 and an RF (radio frequency) section 24. A microphone 26 connects via an analog-to-digital (A/D) converter 28 in the codec 20 to the baseband signaling section 22, and a speaker 30 connects with a digital-to-analog ((D/A) converter 32 in the codec 20n to the baseband signaling section 22. The A/D converter 28 and the D/A converter 32 are driven by a common clock 34. An antenna 36 connects with the RF section 24 for communicating with one of the base stations 12 via a radio link 38.

The RF section 24 comprises a transmitter 40, a duplexer 42, a receiver 44, a modulator, 46, a demodulator 48, and a carrier oscillator 50. In the operation of the RF section 24, outgoing compressed voice signals from the baseband signaling section 22 are coupled by the transmitter 40 and the duplexer 42 to the antenna 36 for transmission to the base station 12. Compressed signals received at the antenna 36 from the base station 12 are applied via the duplexer 42 and the receiver 44 to the baseband signaling section 22. The outputted compressed voice signals of the baseband signaling section 22 are modulated, via the modulator 46, onto a carrier provided by the oscillator 50 prior to being transmitted via the transmitter 40. Signals received by the receiver 44 are demodulated via the demodulator 48, with the aid of a carrier reference signal supplied by the oscillator 50, to provide a demodulated voice signal to the baseband signaling section 22. The baseband signaling section 22 has a vocoder 52 providing the functions of compression of outgoing voice signals and expansion of incoming voice signals. The vocoder 52 includes a compressor 54, an expander 56, and a computer 58. The computer 58 forms a part of the compressor 54 and the expander 56, but is shown as a separate element to facilitate description of the telephone 18. Electric circuitry for the vocoder 52 is provided in a single unit, namely, a DSP 60, which also comprises an input memory 62 for storing a succession of signal samples from the A/D converter 28 and an analyzer 64 for analyzing the succession of stored signal samples to obtain characteristics of the voice signal. These characteristics are employed by the computer 58 in implementing the compression of the voice signal by the compressor 54.

The baseband signaling section 22 further comprises a first program memory 66, an optional second program memory 68, a switch 70 for switching between the two memories 66 and 68, an encoder 72, a summer 74 and a decoder 76 which operates the switch 70. Use of the analyzer 64 by the computer 58 in the process of analyzing various aspects of the voice signal waveform is performed in accordance with a predetermined protocol as set forth in a computer program stored in the memory 66. The protocol also governs cooperation of the computer 58 with the compressor 54 in selecting samples of the signal waveform to be applied to the compressor 54 and an algorithm by which the compression takes place.

Various modes of compression are well known, and need not be discussed here in detail for an understanding of the invention. In a complementary manner to the compression, the expander 56 expands the digitized voice signal emanating from a distant mobile station to restore the digitized voice signal. The converter 28 is operative to provide a sufficient number of digitized samples per second of the voice waveform received at the microphone 26 to enable replication of the voice waveform at the distant mobile station, and the expander 56 provides, in similar fashion, a sufficient number of digital samples of a received voice waveform to enable the converter 32 to reproduce an analog voice signal of high quality. The clock 34 feeds clock signals to the computer 58 for operating the computer 58, as well as other components of the DSP 60 in synchronism with the operation of the converters 28 and 32.

Also included within the baseband signaling section 22 is a controller 78 which connects with the computer 58 for controlling basic well-known operational modes of the telephone 18. Such operational modes include initiation of the telephone call in response to the entry of a dialed number via a keypad 80 connected to the controller 78, a display of prompt and other messages on a display 82 connected to the controller 78, and a responding to an incoming telephone call initiated from a distant mobile station. In the practice of the invention, there are additional functions to be employed. One of these functions is the notification of the base station 12 of the particular type of circuitry employed in the DSP 60, thereby to enable the base station 12 to download a version of the program adapted for operation of the DSP 60. The program is downloaded by placing the program in-storage in the memory 66.

In the event that there is no program stored in the memory 66, or in the event that a user of the telephone 18 signifies via the keypad 80 a desire to employ a program providing a different protocol, or in the event that an RSSI 84 of the telephone 18 signals the controller 78 that the signal strength in a neighboring one of the cells 14 (FIG. 1) is stronger than the signal strength in the present cell 14, then the computer 58 is commanded by the controller 78 to output a request to the base station 12 for a change in protocol. The request is implemented by use of the encoder 72 which encodes a word having a first set of bits designating the request and a second set of bits designating the type of circuitry in the DSP 60. The word outputted by the encoder 72 is added to the output signal of the DSP 60 via the summer 74. The summer 74 serves to interleave the output signal of the encoder 72 with the output signal of the compressor 54 so that, in suitable time slots provided by the computer 58, the request for change of protocol is transmitted via the control channel of the telephone 18 to the base station 12.

The change in protocol can be initiated also by the base station 12, such as a change in bandwidth allocation in accordance with a specific time of day. In either case, whether the request for change on protocol be initiated at the mobile station 16, or at the base station 12, the base station 12 transmits a command word which is recognized by the decoder 76 as signifying that a change in protocol is to take place. The decoder 76 is responsive to various flags, or pointers, placed in various digitally formatted words in the receive signal channel at the output of the demodulator 48, such flags being well known. By examination of the flags, the decoder 76 signifies to the computer 58 that a control signal or a voice message is present on the receive channel.

Upon notification by the decoder 76 that a change in protocol is to be accomplished, the computer 58, via the controller 78, applies a message to the display 82 alerting a telephone subscriber that there is to be a momentary delay for change of protocol. With currently available digital transmission rates, and with the amount of bits contained within a typical program for operation of a DSP, a transmission of a new program containing the new protocol can be accomplished in an interval of time less than approximately 15 seconds. Accordingly, the computer 58 empties the program memory 66, and activates the switch 70 to couple the output of the demodulator 48 to the program memory 66 for downloading the program into the memory 66. In the event that the optional second program memory 68 is employed, then the new protocol program is downloaded via the switch 70 into the second program memory 68 instead of into the program memory 66. In such case, the computer 58 does not clear the first program memory 66, but allows both of the programs to be stored concurrently, respectively, in the memories 66 and 68. Also, there is no need to interrupt the telephonic transmission by the telephone 18 during the downloading of the new program.

Upon completion of the downloading of the new program in the second program memory 68, the computer 58 simply switches the program read-out from a reading out from the memory 66 to a reading out from the memory 68. In the event, in a later interval of time, that a third protocol is to be implemented, then the computer 58 would dump the contents of the first program memory 66 while continuing operation of the DSP 60 based on the second protocol stored in the second program memory 68. After the dumping of the contents of the first program memory 66, the third protocol program would be downloaded into the first program memory 66. In this fashion, numerous substitutions and changes of protocol can be accomplished without interruption of the telephonic communication. This is particularly useful in the case of a hand off of a mobile station, such as the stations 16A–C (FIG. 1) traveling between contiguous ones of the cells 14.

Figure 3:
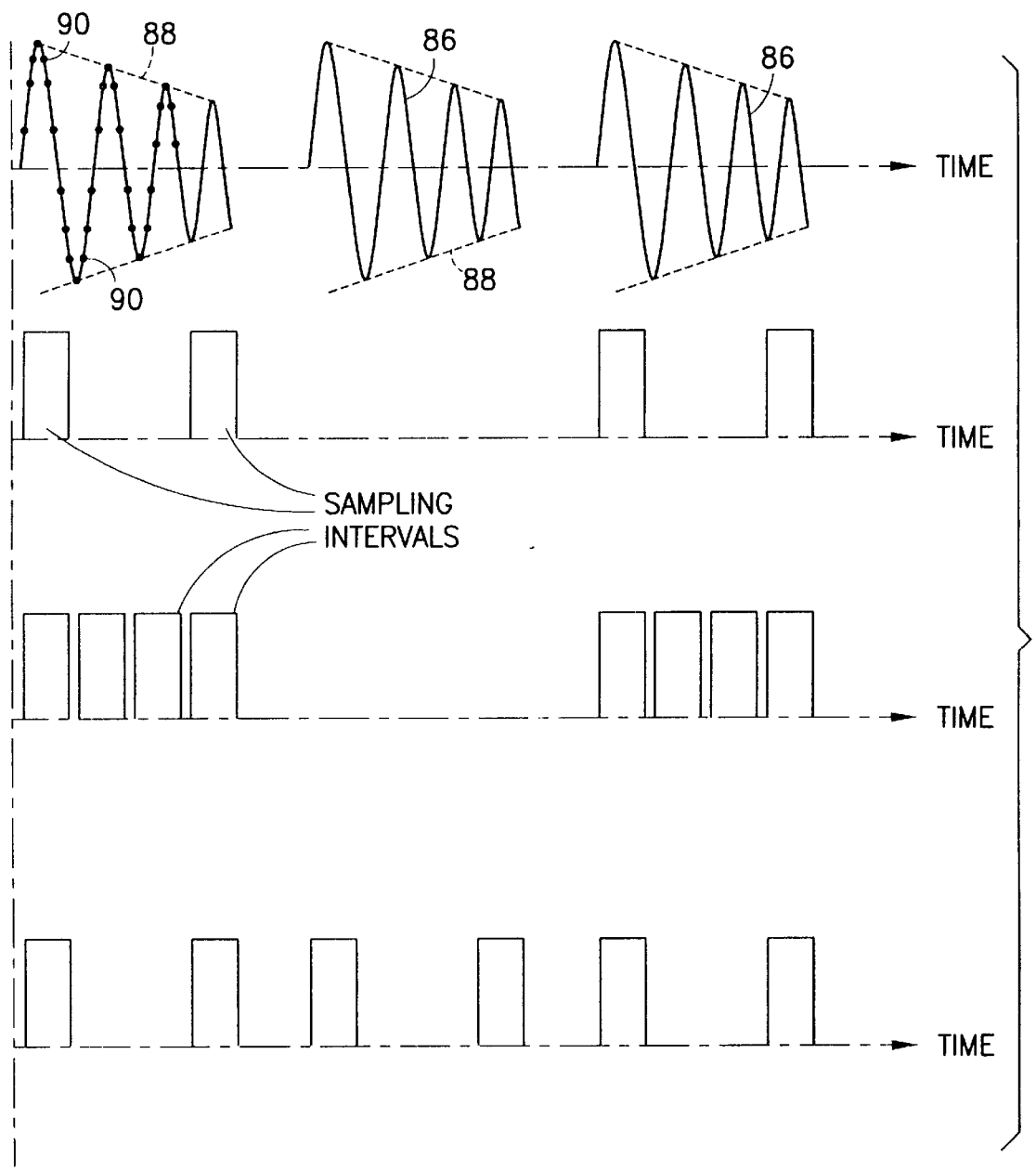
FIG. 3 is a set of four graphs demonstrating in stylized fashion a possible mode of voice compression as a function of available bandwidth.

FIG. 3 presents in stylized fashion a possible operation of the DSP 60 (FIG. 2) in the process of analyzing the voice waveform by the analyzer 64 and compressing the voice waveform by extracting specific samples at the compressor 54. It is to be understood that this is simply an example for purposes of demonstrating speech compression, and may not necessarily be used in a radiotelephone. The first graph of FIG. 3 shows a repeating portion of a voice waveform wherein in each portion, a quasi-sinusoidal component 86 varies in amplitude with increasing time, the variation of the amplitude being, by way of example, a decreasing amplitude which, in periodic fashion returns to its original amplitude and resumes the decrease in amplitude. The envelope of the decreasing amplitude is indicated at 88. Sampling points 90 provided by the A/D converter 28 (FIG. 2) are indicated by little dots on the quasi-sinusoidal components 86 of the voice waveform. By way of example, a commonly used sampling frequency by the converters 28 and 32 (FIG. 2) is 8,000 Hz (hertz) with each sample being represented by 8 bits. This gives a total rate of 64,000 bits per second. A typical transmission bandwidth allows for only 8,000 bits per second and, accordingly, the compressor 54 would output bits of the voice signal at an average rate of 8,000 bits per second. With the CDMA transmission, the bits from the waveform may be transmitted by a burst signal, this being followed by a pause until the next burst signal transmission.

By way of example, if the fundamental frequency of the quasi-sinusoidal component 86 is at 400 Hz, the duration of a period of the component 86 is 2.5 ms (milliseconds). With respect to the format of an acoustic waveform, there are quasi-periodic intervals extending over a range, typically, of 20–40 ms. Thus, with respect to the stylized waveform of the first graph of FIG. 3, it may be assumed that the periodic character of the envelope 88 extends for approximately 10 periods. At the foregoing sampling rate of 8,000 samples per second, there would be twenty of the sampling points 90 per cycle of the quasi-sinusoidal component 86. The waveform of the first graph of FIG. 3, as represented by the sampling points 90, is stored in the input memory 62 (FIG. 2) for viewing by the analyzer 64.

In accordance with a possible protocol for the speech compression, selected periods of the component 86 may be extracted. In the first graph, there are four repetitions of the component 86 for each repeat of the envelope 88. In the second graph of FIG. 2, a possible selection of the samples of the first and the fourth period of the component 86 within each repeat of the envelope 88 is selected. Such a selection enables regeneration of the envelope 88. In view of the repetitive nature of the envelope 88, and of the substantially constant frequency of the quasi-sinusoidal component, the compression protocol may provide for a skipping of the next three repeats of the envelope 88, and for a resumption in a taking of the samples of the component 86 in the next repeat of the envelope 88. Here, again, the samples of the first and the fourth periods of the component 86 are taken, as is indicated in the second graph of FIG. 3. The taking of sample points of only two out of the total of four periods of the component 86 results in a division by 2 in the average value of the sampling rate. The skipping of the next three repeats of the envelope 88 provides for examination of only one out of every four of the waveforms within repeats of the envelope 88. This results in a further division by a factor of four in the average sampling rate to give a total reduction by a factor of 8 in the average sampling rate. Thereby, the DSP 60 has accomplished the aforementioned requirement for a reduction in sampling rate by a factor of 8.

In the event that a mobile station, such as the station 16A (FIG. 1) were to move from the cell 14C to the cell 14A (FIG. 1), the station 16A would experience the aforementioned reduction in telephone traffic. Thus, as has been noted above, the base station of the cell 14A may be employing a protocol which allows for a doubling of the available bandwidth. In such case, the protocol would be implemented, as shown in the third graph of FIG. 3, by allowing for the extraction of twice as many samples. The third graph shows a possible mode of sampling at the high end sampling rate. Instead of taking samples of only the first and the fourth periods of the waveform in an individual one of the repeats of the envelope 88, the third graph shows a taking of samples of all periods of the waveform in an individual one of the repeats of the envelope 88.

The fourth graph of FIG. 3 shows an alternative protocol for doubling the number of samples. In the fourth graph, the scheme of taking samples of the waveform within an individual one of the repeats of the envelope 88 is the same as that shown in the second graph. However, in the fourth graph, there is a skipping of only one repeat of the envelope 88 prior to the extraction of further samples. Thereby, twice as many samples are taken in the sampling mode of the fourth graph as compared to the sampling mode of the second graph. The third and the fourth graphs demonstrate how a different sampling protocol can be employed for compression of a voice waveform while maintaining the same average sampling rate or bandwidth for the signal outputted by the compressor 54 (FIG. 2). The reverse operation, to that which has been demonstrated in the four graphs of FIG. 3, is accomplished by the expander 56 (FIG. 2) to regenerate an incoming voice signal from a distant mobile station 16. The second and the third graphs, or the second and the fourth graphs, demonstrate how a change in compression/expansion protocol can accomplish a change in average sampling rate and required bandwidth.

Figure 4:
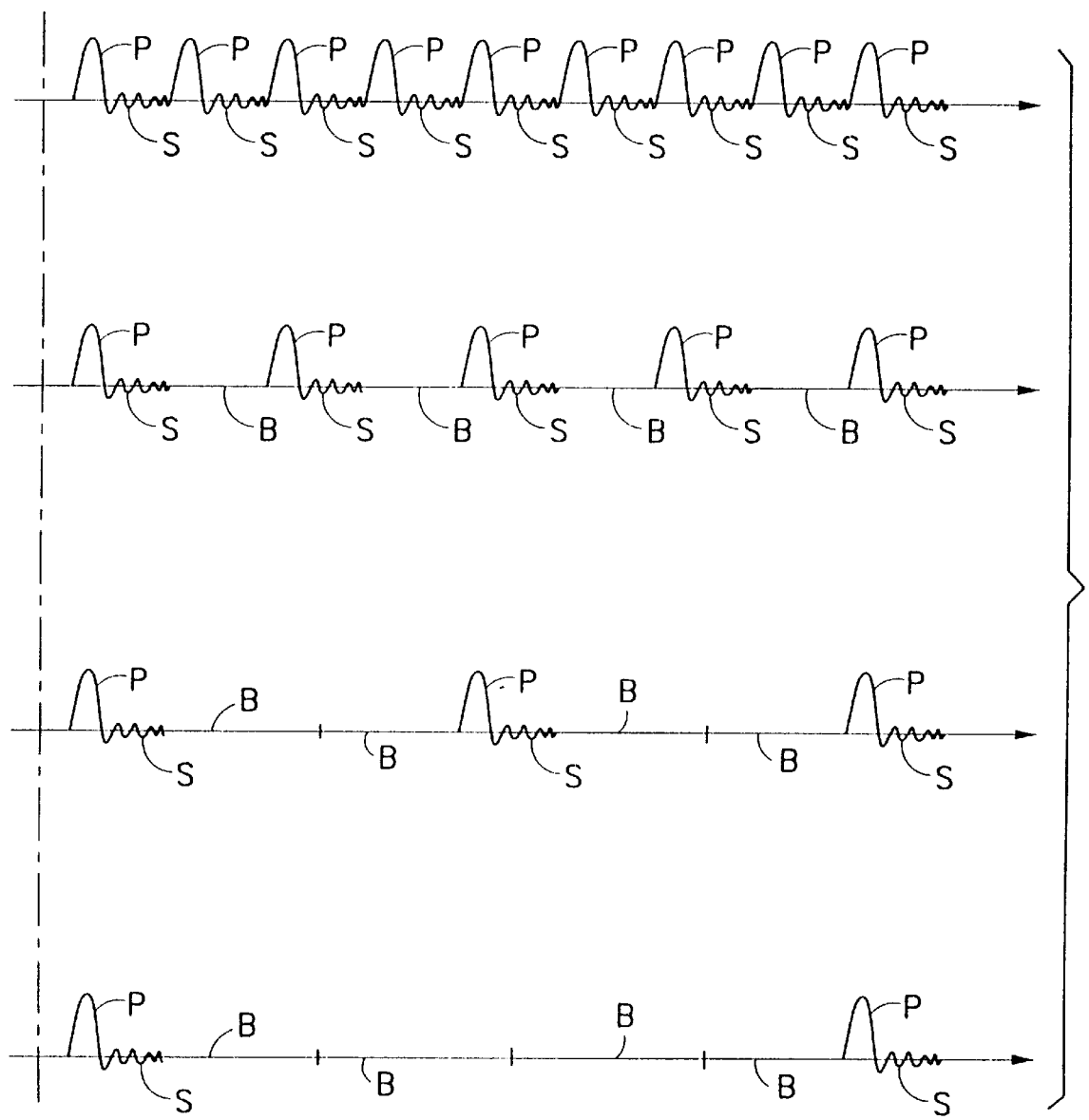
FIG. 4 shows a further set of four graphs demonstrating in stylized fashion another mode of voice compression suitable for use in a radiotelephone system.

FIG. 4 shows a set of four graphs depicting a further example of a process for voice signal compression, this process being suitable for use in a mobile telephone. The first graph shows a stylized voice waveform which is essentially periodic over an interval of time under consideration. Each period of the waveform has a large pulse P followed by a sequence S of smaller pulses. The second graph shows a processing of the foregoing waveform to provide for a 2:1 compression of the voice signal. In the second graph there is a substantially periodic waveform wherein each period comprises the pulse P followed by sequence S followed by a blank interval B having a duration equal to one period of the voice signal (first graph). The blank interval B is not transmitted, this providing a reduction in the amount of the data transmitted to accomplish the speech compression. The third graph shows further compression in a ratio of 4:1 which is accomplished by replacing four consecutive periods of the voice signal (first graph) by pulse P followed by sequence S followed by two blank intervals B. The two blank intervals B are not transmitted. The fourth graph shows further compression in a ratio of 8: which is accomplished by replacing eight consecutive periods of the voice signal (first graph) by pulse P followed by sequence S followed by four blank intervals B. The four blank intervals B are not transmitted. Thereby a desired compression ratio may be provided by the procedure of FIG. 4. This process of voice compression may be employed by the DSP 60.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A system for programming a telephone comprising:
   a base station, and a plurality of mobile stations which communicate via said base station;
   wherein each of said mobile stations comprises a telephone including a digital signal processor (DSP) having compression means for compressing outgoing voice signals, expansion means for expanding incoming voice signals, and a computer forming a part of said compression means and said expansion means;
   wherein said telephone further comprises a memory for storing a first program, said first program serving to direct said computer in accordance with a predetermined protocol to accomplish said compressing and said expanding of voice signals;
   wherein said system further comprises means for downloading said first program from said base station to each of said mobile stations, and means for substituting a second program in place of said first program to alter said protocol; and wherein the DSP in one of said mobile stations differs from the DSP in another of said mobile stations and, in each of said mobile stations, said telephone is operative to transmit to said base station an identification of a type of said telephone's DSP prior to a downloading of said first program, said base station stores a plurality of versions of said first program and of said second program, and said downloading is accomplished by matching a version of each of said first and said second programs to a type of DSP at each of said mobile stations.

2. A system according to claim 1 wherein plural ones of said mobile stations are mobile stations.

3. A system according to claim 1 further comprising a plurality of base stations including said base station;

wherein the telephone in each of said mobile stations comprises:

a received signal strength indicator (RSSI) responsive to signals of at least two of said base stations for selecting one of said at least two base stations having a stronger signal; and command means responsive to said RSSI for directing said stronger-signal base station to download any one of a plurality of protocol programs including said first program and said second program to said telephone to enable communication via said stronger-signal base station.

4. A system according to claim 1 wherein said downloading means includes means for signaling respective ones of said mobile stations to receive a new program.

5. A system according to claim 1 wherein said downloading means includes means for signaling respective ones of said mobile stations to switch to another program.

6. A system according to claim 1 wherein said second program designates a bandwidth of compressed signals different from a compressed-signal bandwidth designated by said first program.

7. A system according to claim 1 wherein said substituting means comprises a further memory located in the telephone of each of said mobile stations for storing said second program, said computer in each of said mobile stations being operative to withdraw data selectively from either of said memory and said further memory.

8. A system according to claim 1 wherein said substituting means comprises means at said base station for selecting said second program from a set of programs, and means for commanding said downloading means to signal respective ones of said mobile stations to receive said second program.

9. A system according to claim 1 wherein said base station is solely in control of selection on one of said programs for accomplishing compression and expansion of voice signals.

10. A system according to claim 9 wherein a selected one of said programs provides operation of a codec of one of said mobile stations at increased bandwidth for higher fidelity of voice transmission.

11. A system according to claim 1 wherein a selected one of said programs provides operation of a codec of one of said mobile stations at decreased bandwidth for higher capacity of telephonic communication via said base station.

12. A system according to claim 1 wherein said first program is retained in said memory until a downloading of said second program by said base station, or until a shut down of said memory by a termination of electrical power to said memory.

13. A system for programming a telephone comprising:

a base station, and a plurality of mobile stations which communicate via said base station;

wherein each of said mobile stations comprises a telephone including a digital signal processor (DSP) having first means for applying a protocol to outgoing voice signals, second means for recovering incoming voice signals from the protocol, and a computer forming a part of said first means and said second means;

wherein said telephone further comprises a memory for storing a first program, said first program serving to direct said computer in accordance with said protocol to accomplish said applying of the protocol and said recovering of voice signals from the protocol;

wherein said system further comprises means for downloading said first program from said base station to each of said mobile stations, and means for substituting a second program in place of said first program to alter said protocol; and wherein the DSP in one of said mobile stations differs from the DSP in another of said mobile stations and, in each of said mobile stations, said telephone is operative to transmit to said base station an identification of a type of said telephone's DSP prior to a downloading of said first program, said base station stores a plurality of versions of said first program and of said second program, and said downloading is accomplished by matching a version of each of said first and said second programs to a type of DSP at each of said mobile stations.

* * * * *